United States Patent [19]

Yakubisin

[11] Patent Number: 5,301,221
[45] Date of Patent: Apr. 5, 1994

[54] INTRA OPERATIVE X-RAY CASSETTE HOLDER

[76] Inventor: Stephen Yakubisin, 903 Union St., Taylor, Pa. 18517

[21] Appl. No.: 41,509

[22] Filed: Apr. 1, 1993

[51] Int. Cl.⁵ .............................................. G03B 42/02
[52] U.S. Cl. ..................................... 378/181; 378/167
[58] Field of Search ............................... 378/181, 167

[56] References Cited

U.S. PATENT DOCUMENTS

| | | |
|---|---|---|
| 2,651,725 | 9/1953 | McFarland . |
| 3,444,368 | 5/1969 | Cosby . |
| 4,352,197 | 9/1982 | Waerve . |
| 4,399,552 | 8/1983 | Renshaw . |
| 4,414,683 | 11/1983 | Robinson . |
| 4,416,020 | 11/1983 | Wagner et al. . |
| 4,468,803 | 8/1984 | Ronci . |
| 5,133,000 | 7/1992 | Moller . |

OTHER PUBLICATIONS

Chick-Langren Orthopedic & Surgical Operative Table Technique Manual 2 pages, publication date unknown.
AliMed Brochure entitled "Diagnostic Imaging Products and Operating Room Accessories 1993" 4 pages.
Amsco brochure entitled "Equipment Manual–Major Surgical Table" dated Feb. 14, 1980, 2 pages.

Primary Examiner—Craig E. Church
Attorney, Agent, or Firm—Howson and Howson

[57] ABSTRACT

Apparatus made of stainless steel which can be attached to the side rail of an operating table to hold and position an x-ray grid and x-ray cassette, and can be readily disassembled for sterilization in an autoclave.

11 Claims, 3 Drawing Sheets

INTRA OPERATIVE X-RAY CASSETTE HOLDER

FIELD OF THE INVENTION

The present invention relates to x-ray cassette holders used to hold and position x-ray grids and cassettes relative to a patient, and more particularly, the present invention relates to holding and positioning x-ray grids and cassettes relative to a patient on an operating table during surgical operations, such as lower back surgery, cervical fusion, and the like.

BACKGROUND OF THE INVENTION

X-ray film is used to capture the image of internal structures of the body through which x-rays are passed. An x-ray cassette is a lightweight housing containing a sheet of x-ray film. An x-ray grid is a grating consisting essentially of a series of narrow lead strips closely spaced on their edges and separated by spacers of low density material. The x-ray grid is used to reduce the amount of scattered radiation reaching the x-ray film. An x-ray grid-cassette is a housing containing both x-ray grid and film. Hereinafter, an x-ray grid-cassette will be referred to as a grid, and an x-ray cassette will be referred to as a cassette.

Surgical procedures often require the taking of x-rays before, during and after the surgery. It is necessary to have flexibility in positioning x-ray grids and cassettes relative to the patient lying on an operating table. It is also necessary for the environment of the operating room to be and remain sterile. During some operations, such as those on the lower back, e.g. lumbar laminectomy, precise x-ray images are critical and require long x-ray exposure times.

Several x-ray cassette holders are available which attach to the operating table and allow an x-ray cassette to be positioned relative to a patient lying on an operating table. For instance, U.S. Pat. No. 2,651,725 issued to A. M. McFarland discloses an x-ray cassette holder which allows a wide range of adjustments of the x-ray cassette relative to the patient.

It is currently common practice in hospitals to sterilize devices in autoclaves. One of the major disadvantages of the prior art cassette holders is that they cannot be sterilized in an autoclave. The size of a typical autoclave oven found in a hospital surgical suite has an opening of 15 inches by 15 inches, and a depth of 27 inches. The size of the prior art x-ray cassette holders, for instance that of McFarland mentioned above, do not enable them to fit within the cavity of the typical autoclave currently found in surgical suites at hospitals, even if they could be autoclaved.

Another disadvantage of the prior art x-ray cassette holders is their capacity to hold only a single x-ray cassette. Certain surgical operations, such as lumbar laminectomy and cervical fusion, require precise x-ray imaging. For such imaging, long exposure times are necessary. During the long exposure time required for lumbar laminectomy, not all the radiation will be absorbed by a single x-ray grid. Some radiation will leak through the single x-ray grid resulting in back scatter radiation and exposing the patient to additional unnecessary radiation. Back scatter radiation obscures the x-ray photograph decreasing the accuracy of the image.

SUMMARY OF THE INVENTION

Accordingly, it is an object of the present invention to provide an improved x-ray cassette holder which can hold and position x-ray grids and cassettes relative to a patient on an operating table and be made from a material which will allow it to be sterilized in an autoclave.

Another object is to provide an x-ray cassette holder which will fit in the cavity of a typical autoclave currently found in hospital surgical suites.

Still another object is to provide an x-ray cassette holder having a means of limiting back scatter radiation to provide more precise imaging.

Still another object is to provide an x-ray cassette holder having an upper member which can be removed from a lower member so that the upper member can remain sterile for later use.

Briefly, these and other objects of the invention are achieved by a stainless steel device which can be attached along the side of an operating table, can be adjusted to position an x-ray grid or cassette, can hold an x-ray cassette behind an x-ray grid, and is small enough to fit in the cavity of an autoclave. In a preferred embodiment, a lower support assembly attaches to a Clark socket which is commonly found in an operating room. An upper support assembly adjustable attaches to the lower support assembly, and brackets are adjustable attached to the upper support assembly for holding multiple cassettes or a grid and cassette back-to-back. The entire assembly can be taken apart and placed into an autoclave cavity as small as about 21 inches by 8 inches by 1.5 inches.

BRIEF DESCRIPTION OF THE DRAWINGS

The foregoing and other objects, features and advantages of the present invention should become apparent from the following description when taken in conjunction with the accompanying drawings, wherein.

DESCRIPTION OF THE PREFERRED EMBODIMENT

Figure 1:
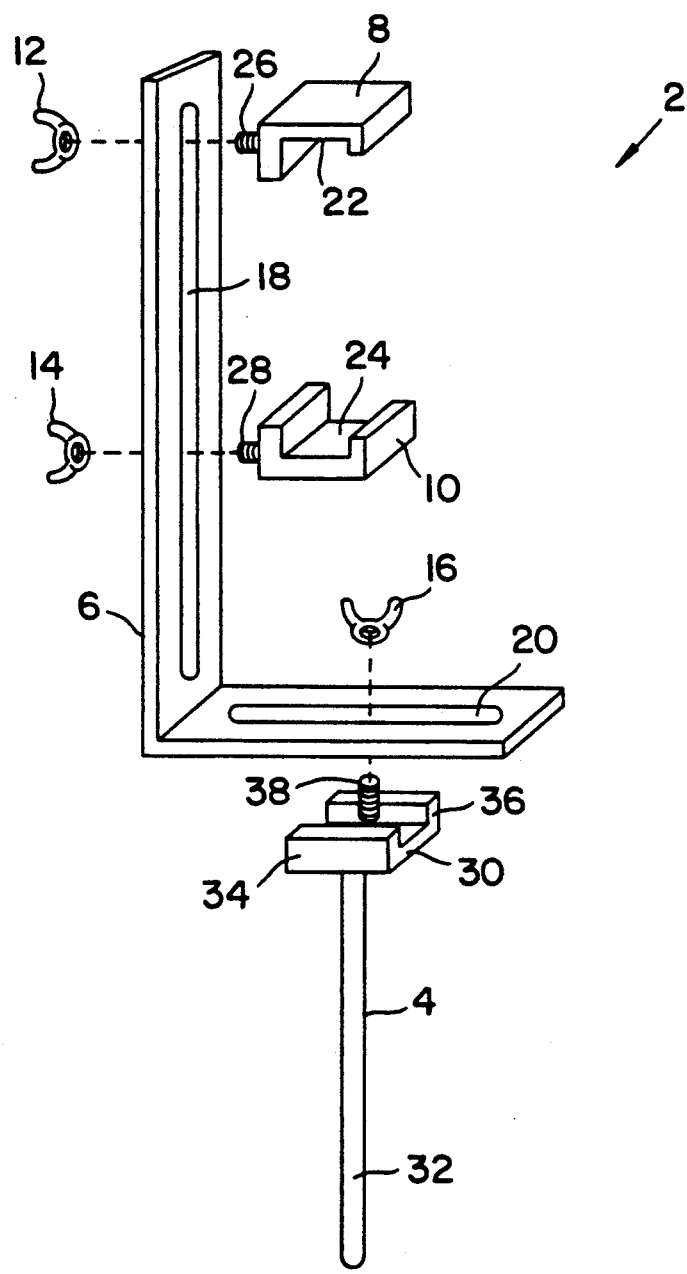
FIG. 1 is a perspective view of an x-ray cassette holder according to the invention.

Referring now to the drawings wherein like reference characters designate like or corresponding parts throughout the several views, there is illustrated in FIG. 1 an x-ray cassette holder 2, generally comprising a lower support assembly 4, an upper support assembly 6, brackets 8, 10, and fasteners 12, 14, 16. The upper support assembly 6 is L-shaped and has a vertical leg with an elongate slot 18 and a horizontal leg with an elongate slot 20.

The brackets 8, 10 attach the x-ray cassettes to the x-ray cassette holder 2. The bracket 8 has a channeled portion 22 which can receive a portion of the top of two x-ray cassettes or one grid and one cassette back-to-back. (See FIG. 2). The bracket 10 has a channeled portion 24 which can receive a portion of the bottom of two x-ray cassettes or one grid and one cassette back-to-back. The brackets 8, 10 have machine screws 26, 28 which extend from the back of the brackets. The machine screws 26, 28 fit and extend through the vertical slot 18 of the upper support assembly 6. The fasteners 12, 14 cooperate with the machine screws 26, 28 to secure the brackets 8, 10 to the upper support assembly 6.

A wide range of adjustments are provided by the connection of the brackets 8, 10 to the upper support assembly 6. Since the brackets 8, 10 can be connected anywhere along the length of the vertical slot 18, various size x-ray grids and cassettes can be held by the x-ray cassette holder 2. In addition, x-ray grids and cassettes can be held at various vertical positions along the upper support assembly 6. Further, the connection of the brackets 8, 10 to the upper support assembly 6 allows rotational adjustment of the brackets 8, 10 relative to the upper support assembly 6.

Lateral adjustments are provided by the connection of the lower support assembly 4 to the upper support assembly 6. In order to provide lateral adjustment, the lower support assembly 4 has a channeled member 30 and a post 32. The channeled member 30 is used to secure the lower support assembly 4 to the upper support assembly 6. The channeled member 30 has side walls 34, 36 and a machine screw 38. The machine screw 38 can be extended through the horizontal slot 20 of the upper support assembly 6, while the upper support assembly 6 fits between the side walls 34, 36 of the lower support assembly 4. The fastener 16, in the illustrated embodiment a wing nut, cooperates with the machine screw 38 to secure the connection.

The location of the connection of the lower support assembly 4 to the upper support assembly 6 is adjustable along the horizontal slot 20. With the lower support assembly attached to the side rail of an operating table, the connection between the lower and upper assemblies can be adjusted to position x-ray grids and cassettes either proximal to, or distal from, the side of an operating table. In addition, the x-ray grids and cassettes and the upper support assembly 6 can be completely removed from the lower support assembly 4, thereby leaving the upper support assembly 6 sterile for later use.

Figure 2:
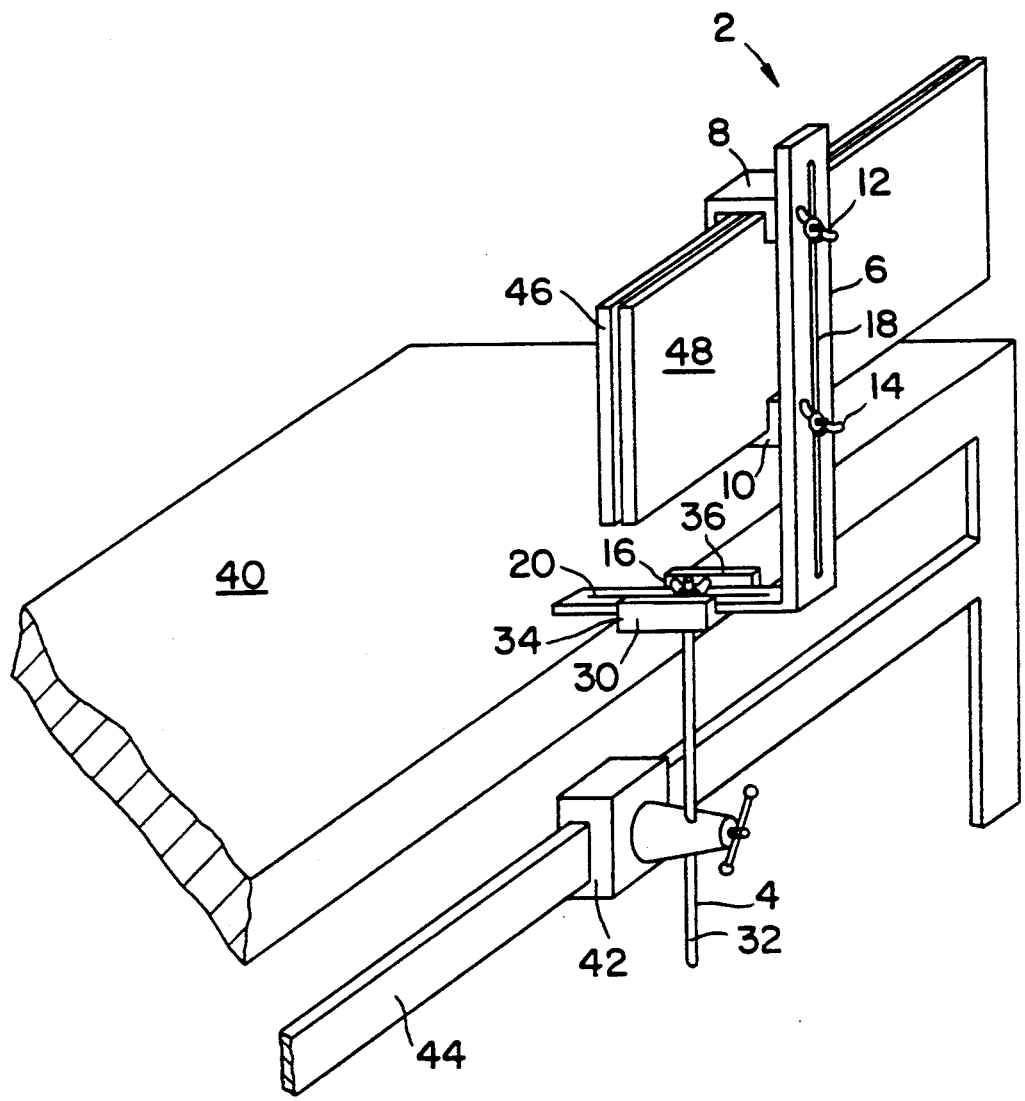
FIG. 2 is a perspective view of an x-ray cassette holder according to the invention shown connected to an operating table and holding one grid and one cassette.

As shown in FIG. 2, the x-ray cassette holder 2 is connected to operating table 40. A Clark socket 42 is secured to the side rail 44 of the operating table 40. Clark sockets are a commonly found article in operating rooms of hospitals. They have many uses for rigidly securing an upright rod to a side rail of an operating table. Examples of uses of Clark sockets in operating rooms are table-mounting a surgical retractor support, leg stirrups, anesthesia screen, and lateral support devices to hold a patient in a decubitus position on an operating table.

The Clark socket 42 can be located anywhere along the side rail 44. The post 32 of the lower support assembly 4 is held in place by the Clark socket 42. The Clark socket 42 can be tightened to rigidly secure the post 32 at any vertical location along post 32, thereby allowing a second means of vertical adjustment of the position of the held x-ray grids and cassettes.

The present invention is especially useful when precise x-ray imaging is critical and where back scatter radiation must be prevented. FIG. 2 shows the brackets 8, 10 securing an x-ray grid 46 and an x-ray cassette 48 to the x-ray holder 2. The x-ray cassette 48 limits back scatter radiation which tends to decrease the quality of the image on the x-ray photograph. Without the use of x-ray cassette 48, x-ray photographs requiring long exposure times will result in radiation leaking through the x-ray grid 46 resulting in diminished quality of x-ray imaging and additional unnecessary radiation exposure to the patient. With the x-ray grid directly in front of the x-ray cassette, the radiation which leaks through the grid is absorbed by the x-ray cassette.

Diminished quality of x-ray imaging can also occur when the x-ray beam shooting equipment is not in proper relation to the grid lines of the x-ray grid. If the grid lines in the x-ray grid do not run parallel to the x-ray beam, grid cutoff will occur on the x-ray film thereby diminishing the quality of the image. Many operating tables, or portions of operating tables, can be positioned at angles relative to the floor of the operating room. Therefore, when an operating table is in a tilted position, the x-ray cassette holder may also assume a tilted position. This creates inaccuracies in lining up the x-ray beam with the tilted x-ray grid.

Figure 3:
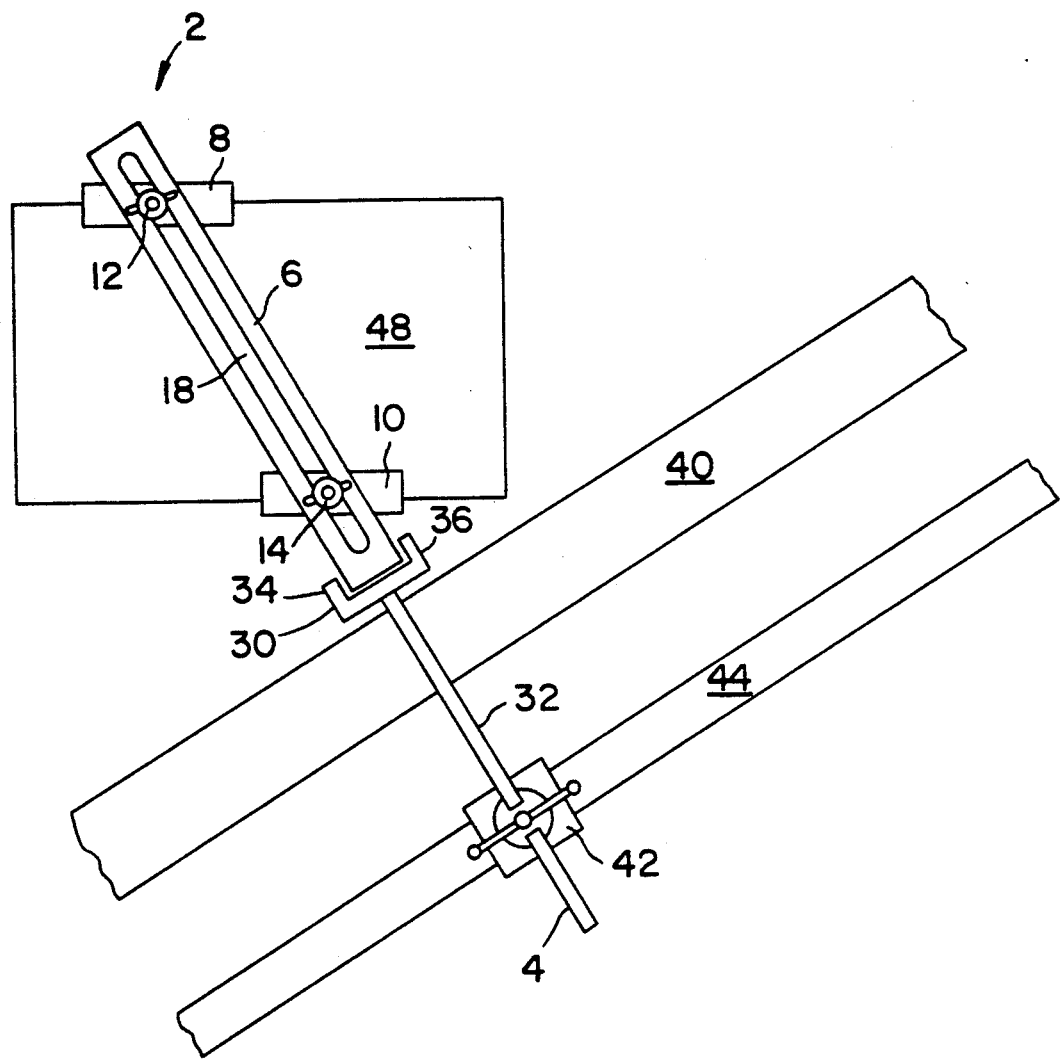
FIG. 3 is a side elevational view of an operating table positioned at an angle relative to the floor of the operating room with an x-ray cassette holder according to the invention positioning an x-ray cassette parallel to the floor of the operating room.

The present invention is versatile since it accommodates a variety of operating table positions. FIG. 3 illustrates an operating table 40 in a tilted position relative to the floor of the operating room. Since the operating table 40 is at an angle relative to the horizontal, the x-ray cassette holder 2, connected to the Clark socket 42 on the side rail 44, is positioned at an angle relative to the vertical. The connection between the brackets 8, 10 and the upper support assembly 6 allows brackets 8, 10 to be secured at an angle relative to upper support assembly 6. Therefore, an x-ray grid 46 (not shown in FIG. 3) and an x-ray cassette 48 can be positioned parallel to the floor of the operating room. This makes alignment of the x-ray beam with the x-ray grid easier and more accurate resulting in more precise x-ray imaging.

The present invention is also capable of holding a grid and a cassette which have been placed in a clear plastic drape or bag. The drape is used during surgical procedures to further ensure a sterile surgical environment.

It will be understood, of course, that various changes may be made by those skilled in the art within the principle and scope of the invention as expressed in the appended claims.

I claim:

1. Apparatus for holding and positioning an x-ray grid and a cassette, alone or in combination, relative to a patient on an operating table having a side rail, comprising:
    a lower support assembly mountable at a selected location along said side rail;
    an upper support assembly releasably and adjustably attached to said lower support assembly, said upper support assembly including an L-shaped member having a vertical leg with an elongate slot and a horizontal leg with an elongate slot; and
    bracket means adjustably attached to said upper support assembly for holding various size x-ray grids and cassettes at various vertical and angular positions relative to said upper support assembly; whereby the attachment of said upper support assembly to said lower support assembly is adjustable to position said x-ray grids and cassettes a desired distance from said operating table, and said upper support assembly is removable from said lower support assembly so that said lower support assembly can remain attached to said side rail.

2. Apparatus according to claim 1, wherein said lower support assembly has a channeled interface surface for slidably receiving said upper support assembly, and means for securing said upper support assembly to said channeled interface surface.

3. Apparatus according to claim 1, wherein said bracket means include two individual brackets which attach to said L-shaped member at a selected location along said vertical slot such that said individual brackets can be disposed at any selected angular relation relative to said L-shaped member.

4. Apparatus according to claim 3, wherein said brackets can hold at least two x-ray grids and cassettes back to back.

5. Apparatus for holding and positioning an x-ray grid and cassette, alone or in combination, relative to a patient on an operating table having a side rail, comprising:
 a lower support assembly having a channeled interface surface, said lower support assembly being attached to said operating table at a selected location along said side rail;
 an L-shaped member having a vertical leg with an elongate slot, said L-shaped arm being slidably received by said channeled interface surface and releasably and adjustably attached to said channeled interface surface; and
 a plurality of brackets adjustably attached to said L-shaped member along said vertical slot for holding various size x-ray grids and cassettes at various vertical and angular positions relative to said upper support assembly;
 whereby the attachment of said L-shaped member to said lower support assembly is adjustable to position said x-ray grids and cassettes a desired distance from said operating table, and said L-shaped arm is removable from said lower support assembly so that said lower support assembly can remain attached to said side rail.

6. Apparatus for holding and positioning an x-ray grid and cassette, alone or in combination, relative to a patient on an operating table having a side rail, comprising:
 a lower support assembly having a channeled interface surface and a post, said post being attached to said operating table at a selected location along said side rail;
 an L-shaped member having a vertical leg with an elongate slot and a horizontal leg with an elongate slot, said horizontal leg being releasably and adjustably attached to said channeled interface surface;
 first releasable clamping means for attaching said horizontal leg to said channeled interface surface;
 at least two brackets, each having a portion extending through said elongate slot of said vertical leg for holding various size x-ray grids and cassettes at various vertical and angular positions relative to said upper support assembly; and
 at least two second releasable clamping means for securing each of said at least two brackets to said upper support assembly;
whereby said apparatus can be disassembled to fit in an autoclave.

7. Apparatus according to claim 6 wherein all of said apparatus is fabricated of stainless steel.

8. Apparatus according to claim 6, wherein said L-shaped member has the approximate dimensions of 21 inches by 8 inches by 1 inch.

9. Apparatus according to claim 6, wherein said lower support assembly has the approximate dimensions of 12 inches by 3 inches by 1.5 inches.

10. Apparatus according to claim 6, wherein said brackets have the approximate dimensions of 6 inches by 4 inches by 1 inch.

11. Apparatus according to claim 6, wherein said first and second releasable clamping means include machine screws and wing nuts.

* * * * *